United States Patent [19]
Chou et al.

[11] Patent Number: 5,770,657
[45] Date of Patent: Jun. 23, 1998

[54] CURING AGENTS FOR AQUEOUS EPOXY RESINS

[75] Inventors: Jason L. Chou; Shailesh Shah, both of Dresher; Brian G. Jewell, North Wales; Robert M. Moon, Maple Glen, all of Pa.

[73] Assignee: Henkel Corporation, Plymouth Meeting, Pa.

[21] Appl. No.: 675,514

[22] Filed: Jul. 3, 1996

Related U.S. Application Data

[63] Continuation of Ser. No. 279,587, Jul. 25, 1994, abandoned.
[51] Int. Cl.[6] ............................ C08G 65/32; C08G 59/68
[52] U.S. Cl. ......................... 525/407; 525/504; 525/524; 528/93; 528/103; 528/105; 528/120
[58] Field of Search .................................. 525/404, 407, 525/504, 524; 528/93, 103, 105, 120; 214/11

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kinnemah et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/65 |
| 4,113,684 | 9/1978 | Petrie | 260/29.2 |
| 4,116,900 | 9/1978 | Belanger et al. | 260/18 |
| 4,134,864 | 1/1979 | Belanger | 260/18 |
| 4,137,140 | 1/1979 | Belanger | 204/18 |
| 4,139,510 | 2/1979 | Anderson | 260/18 |
| 4,182,831 | 1/1980 | Hicks | 528/103 |
| 4,197,389 | 4/1980 | Becker et al. | 528/103 |
| 4,246,148 | 1/1981 | Shimp et al. | 260/18 |
| 4,315,044 | 2/1982 | Elmore et al. | 427/386 |
| 4,420,574 | 12/1983 | Moriarity et al. | 523/404 |
| 4,420,606 | 12/1983 | Waddill | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,539,347 | 9/1985 | DeGooyer | 523/404 |
| 4,608,405 | 8/1986 | DeGooyer | 523/404 |
| 4,608,406 | 8/1986 | Williams et al. | 523/424 |
| 4,678,712 | 7/1987 | Elliott | 428/418 |
| 4,728,384 | 3/1988 | Goel | 156/307.3 |
| 4,738,995 | 4/1988 | Kooijums et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijmans et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,221,700 | 6/1993 | Gilbert et al. | 523/404 |
| 5,246,984 | 9/1993 | Darwem et al. | 523/404 |

OTHER PUBLICATIONS

"Water–Reducible Coatings via Epoxy Resin Modification with Jeffamine (Reg. TM) ED–2001 and Jeffamine (Reg TM) M–1000".

"Jeffamine® Polyoxypropyleneamine Curing Agents for Epoxy Resins", Texaco Cheimcal Company.

"Advanced Amine Technology for Superior Polymers", Texaco Chemical Company, 1992.

H. Lee and K. Neville, "Epoxy Polymers," *Encyclopedia of Polymer Science and Technology*, vol. 6, pp. 209–271, John Wiley and Sons, Inc., 1967.

W.C. Griffith, "Emulsions", *Encyclopedia of Chemical Technology*, vol. 8, pp. 900–930, John Wiley and Sons, New York, NY, 1979.

*Encyclopedia of Polymer Science and Engineering*, John Wiley and Sons, New York, NY vol. 6, pp. 340–61, 1986.

*Primary Examiner*—Randy Gulakowski
*Attorney, Agent, or Firm*—Wayne C. Jaeschke; John Daniel Wood; Daniel S. Ortiz

[57] ABSTRACT

Provided are epoxy curing agents comprising the reaction product of reactants consisting essentially of a monoalkylene polyamine having less than about 12 carbon atoms, an alicyclic diamine in an amount of greater than about 10% of the amine equivalents of said amine component, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is are greater than one, and the ratio of epoxide equivalents of said aromatic mono-glycidyl ether to epoxide equivalents of said diglycidyl ether of an aromatic diol is greater than one. The reaction product is preferably employed as a curing agent for an aqueous epoxy resin in a two component coating system wherein said curing agent, essentially free of acids, is mixed with an aqueous epoxy resin emulsion and then the resulting mixture is applied as a continuous coating to a rigid substrate, e.g. as an industrial maintenance coating.

19 Claims, No Drawings

CURING AGENTS FOR AQUEOUS EPOXY RESINS

This application is a continuation, of application Ser. No. 08/279,587 filed on Jul. 25, 1994 now abandoned.

FIELD OF THE INVENTION

The present invention relates to curing agents for aqueous epoxy resins and to their use. More particularly, it relates to the reaction product of polyamines with glycidyl ethers that are useful as curing agents for aqueous epoxy resin emulsions, which cured resins are, in turn, useful as protective coatings.

BACKGROUND OF THE INVENTION

Solvent based, epoxy resin curing agent systems have been known for many years. However, these solvent systems often are quite flammable and many exhibit disagreeable odors. In recent years, increasingly strict regulation of environmental pollutants has lead to a limitation on the types and amounts of organic solvents which can be used in epoxy resin curable systems. The first approach to these limitations on the solvent content of coating systems was simply to employ a surfactant and emulsify or disperse existing solvent-based polymeric systems in water. Examples of such systems include U.S. Pat. No. 3,301,804 which discloses the use of the reaction product of boric acid, an alkylene glycol, and a beta-dialkyl-substituted aminoalkanol as an emulsifier, U.S. Pat. No. 3,634,348 which discloses the use of a phosphate ester as an emulsifying agent, and U.S. Pat. No. 3,249,412 which discloses the use of a combination of a cationic emulsifying agent, selected from the group consisting of imidazolines and amides, and a non-ionic emulsifying agent.

However, the cured products which result from these emulsions or dispersions may exhibit poor properties when compared to prior art solvent-based systems. In particular, the chemical and water resistance of such systems may be lower because of the high levels of surfactant which were needed.

U.S. Pat. No. 4,166,900 discloses cathodic electrodeposition resins prepared based upon polyepoxides, polyamines and monoepoxides. Polyepoxide resins are adducted with polyamines which are further reacted with a monoepoxide or a monocarboxylic acid. It is disclosed that the resinous adducts are water soluble or water dispersible when salted with an acid. It is also stated that the resin solutions or dispersions are particularly useful in cathodic electrodeposition processes for prime coating metal objects.

U.S. Pat. No. 4,246,148 discloses a two component industrial maintenance coating. The first component is a polyamine terminated epoxy resin which is end capped with a monoepoxide, at least 25 mole percent of the monoepoxide being an aliphatic monoepoxide. The second component is a low molecular weight polyepoxide crosslinker. It is disclosed that the adduct can be dissolved or dispersed in water when salted with an acid. The polyepoxide crosslinker can then be microemulsified in the system. When coated on a substrate, the two component mixture is said to cure at room temperature producing coatings having a balance of chemical and physical properties.

U.S. Pat. No. 4,608,405 discloses an ambient temperature curing agent used to cure epoxide resins. The curing agent preferably is prepared by coreacting under liquid advancement conditions, a diglycidyl ether of a dihydric phenol, a diglycidyl ether of an aliphatic dihydroxy polyether and a dihydric phenol to produce a product having an average weight per epoxide (WPE) of about 400 to about 1300. Substantially all of the epoxy groups which remain in the advanced product are then reacted with a polyamine and at least each primary amine group of the polyamine/diepoxide reaction product is further reacted with a monoepoxide or a monocarboxylic acid. It is stated that these curing agents may be salted with a volatile acid and employed in aqueous systems to provide coatings having superior cured states film properties. It is also stated that, while the preparations of these curing agents by the liquid advancement process is preferred, it is also possible to prepare similar curing agents by starting with the corresponding dihydric phenol and aliphatic dihydroxy polyether and epoxidizing this mixture using well known epoxidization techniques.

SUMMARY OF THE INVENTION

This invention relates to epoxy curing agents comprising the reaction product of reactants consisting essentially of:

an amine component consisting essentially of a monoalkylene polyamine having less than about 12 carbon atoms (preferably a member selected from the group consisting of lower alkylene diamines, said member having from 2 to 8 carbon atoms and, more preferably, only straight-chain alkylene groups) and an alicyclic polyamine, said alicyclic polyamine being present in an amount of greater than about 10% of the amine equivalents of said amine component, an aromatic mono-glycidyl ether having less than about 18 carbon atoms (preferably selected from the group consisting of mono-alkylphenyl glycidyl ethers and di-alkyl phenyl glycidyl ethers having from 9 to 13 carbon atoms), and a diglycidyl ether of an aromatic diol having an average degree of oligomerization of less than about 3.5 (preferably less than about 1.5, and preferably derived from an alkyl bis-phenol, e.g. bisphenol A), wherein:

the ratio of primary amine equivalents of said alkylene polyamine to the total epoxide equivalents of said aromatic glycidyl ether and said diglycidyl ether of an aromatic diol are greater than essentially one (i.e. the molar equivalents of primary amine groups of said polyalkylene polyamine are in excess of the molar equivalents of glycidyl groups, e.g. a ratio of from about 1.5:1 to 2.5:1, preferably from about 1.75:1 to about 2.25:1), and the ratio of epoxide equivalents of said aromatic monoglycidyl ether to epoxide equivalents of said diglycidyl ether of an aromatic diol is greater than one (preferably greater than 1.5, more preferably from about 2:1 to about 6:1, and most preferably from about 3:1 to 5:1).

The reaction product is preferably employed as a curing agent for an aqueous epoxy resin in a two component coating system wherein said curing agent, essentially free of acids, is mixed with an aqueous epoxy resin emulsion and then the resulting mixture is applied as a continuous coating to a rigid substrate.

DETAILED DESCRIPTION OF THE INVENTION

The curing agents of this invention are prepared from three major reaction components. The first component is a mono-alkylene polyamine, the second component is an aromatic glycidyl ether, and the third component is diglycidyl ether of an aromatic diol. The nature of these components will be addressed in turn below.

The alkylene polyamines useful in this invention can be characterized as lower alkylene polyamines. These materials are commercially available or can be prepared by conventional preparative techniques. These contain at least 2 amine nitrogen atoms per molecule, at least 3 amine hydrogen atoms per molecule and no other groups which are reactive with epoxide. Useful polyamines typically contain about 2 to about 6 amine nitrogen atoms per molecule, 3 to about 8 amine hydrogen atoms, and 2 to about 12 carbon atoms. Mixtures of amines can also be used.

Examples of such amines are the alkylene polyamines ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, 1,7-heptylene diamine, 1,10-decylene diamine, and the like. Examples of the preferred mono-alkylene polyamines include 1,4-butylene diamine (tetramethylene diamine), 1,6-hexylene diamine (hexamethylene diamine), and 1,8-octylene diamine (octamethylene diamine).

Alicyclic diamines are also included in the diamine component in an amount greater than about 10% of the total amine equivalents of the amine component. Examples of alicyclic diamines include 1,4-diaminocyclohexane, 1,2-diaminocyclohexane, N-aminoethylpiperazine, and isophorone diamine. The amine component is preferably comprised of a major amount (i.e. greater than 50 equivalent percent) on a molar basis of a mono-alkylene polyamine and a minor amount (i.e. less than 50 equivalent percent) on a molar basis of a cyclic polyamine, preferably at a ratio of mono-alkylene polyamine equivalents to cyclic diamine equivalents of 2:1 to 6:1, and most preferably 3:1 to 5:1.

The polyepoxide materials useful in this invention are glycidyl polyethers of dihydric phenols and contain, on average, more than one, but not more than two 1,2-epoxide groups per molecule. Such polyepoxide materials are derived from an epihalohydrin and a dihydric phenol and have an epoxide equivalent weight of about 100 to about 4000, preferably from about 125 to about 525, and more preferably from about 150 to about 350. Examples of epihalohydrins are epichlorohydrin, epibromohydrin and epiiodohydrin, with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxyphenyl ethane, bis-(2-hydroxy-naphthyl)-methane, 1,5-dihydroxynaphthalene and the like with Bisphenol A being preferred.

These polyepoxide materials are well known in the art and are made in desired molecular weights by reacting the epihalohydrin and the dihydric phenol in various ratios or by reacting a dihydric phenol with a lower molecular weight polyepoxide material. Preferred polyepoxide materials are glycidyl polyethers of Bisphenol A having epoxide equivalent weights of about 150 to about 525 and, thus, have from just greater than 1.0 (e.g. from about 1.1) to just less than 3.5 (e.g. up to about 3.4) dihydric phenol groups per polyether molecule, and more preferably have epoxide equivalent weights of less than 400.

The third component is an aromatic mono-glycidyl ether, i.e., a compound having at least one aromatic ring having attached thereto an glycidyl functional group and no other reactive functional groups. Representative examples of aromatic mono-glycidyl ethers include the monoglycidyl ethers of monohydric aromatic alcohols such as phenol and naphthanol, mono- or dialkyl-substituted monoglycidyl ethers of monohydric aromatic alcohols, said alkyl groups having from about 1 to about 4 carbon atoms, such as the monoglycidyl ether of o-cresol, m-cresol, p-cresol, o-ethyl-phenol, m-ethyl-phenol, p-ethyl-phenol, o-(n-propyl)-phenol, m-(n-propyl)-phenol, p-(n-propyl)-phenol, o-isopropyl-phenol, m-isopropyl-phenol, p-isopropyl-phenol, o-(n-butyl)-phenol, m-(n-butyl)-phenol, p-(n-butyl)-phenol, m-(t-butyl)-phenol, p-(t-butyl)-phenol, 2,4-dimethyl-phenol, 3,5-dimethyl-phenol, 3-methyl-5-ethyl-phenol, 2-methyl-4-(n-propyl)phenol, or 2-methyl-4-(t-butyl)-phenol. The preferred aromatic mono-glycidyl ether is o-cresyl glycidyl ether.

The ratios of the reactants are selected so that the primary amine equivalents of the amine component are greater than total epoxide equivalents of said aromatic glycidyl ether and said diglycidyl ether of an aromatic diol. This means that, on average, less than all of the primary amine groups will be converted to secondary amines (i.e. a group still having a reactive secondary amine hydrogen, albeit less reactive than a primary amine hydrogen). The ratio of total amine equivalents of the amine component to the total epoxide equivalents of said aromatic glycidyl ether and said diglycidyl ether of an aromatic diol will preferably be from about 1.5:1 to about 2.5:1 and most preferably from about 1.75: to about 2.25:1.

The order of reaction of the diglycidyl ether of an aromatic diol and the aromatic mono-glycidyl ether with the amine component is not critical. Thus, the mono-alkylene polyamine there can be a pre-reaction of the amine component with the diglycidyl ether of an aromatic diol, or a simultaneous reaction can be accomplished by co-addition of proportionally adjusted amounts said aromatic mono-glycidyl ether and said diglycidyl ether of an aromatic diol, or a pre-reaction of the mono-glycidyl ether with the mono-alkylene polyamine.

The ratio of epoxide equivalents of said aromatic mono-glycidyl ether to epoxide equivalents of said diglycidyl ether of an aromatic diol is greater than 1, preferably greater than 1.5, more preferably from about 2:1 to about 6:1, and most preferably from about 3:1 to 5:1.

While not wishing to exclude any other components unnecessarily, it is noted that the use of glycidyl ethers of polyoxyalkylenes and/or volatile acids to salt the curing agent are not needed in the curing agent and so should be excluded. Further, it is believed that the selection of components is so important to the performance of the curing agent that other components which would affect the essential attributes of the curing agent, or cured epoxy resins prepared therefrom, should be excluded. The skilled artisan will, with the aid of the following description, be able to determine whether a particular component in a particular amount will affect the attributes of the curing agent in an essential manner, i.e. will prohibit its use as a curing agent for an aqueous epoxy emulsion used to prepared a protective coating when cured.

The reaction medium is typically maintained at moderate temperatures during the reaction. Such temperatures avoid degradative side reactions which can affect the appearance (e.g. by excessive color formation) of the reaction product. Typical temperatures that will be maintained during the reaction range from about 35° C. to about 80° C., preferably from about 40° C. to about 75° C., for a time sufficient to bring the reaction to completion, typically about 5 minutes to 3 hours. Lower temperatures may be employed at the expense of increasing the reaction time. The reaction medium is also typically treated to exclude oxygen to a practicable degree, e.g. by blanketing and/or sparging the reaction zone with an inert gas, e.g. dry nitrogen.

The product which results after the epoxide material has been reacted with the polyamine is extremely viscous and it is preferred that an oxygenated solvent be present in the reaction medium or added to the reaction product to reduce its viscosity. The preferred solvents are the glycol ethers such as the various lower alkyl ethers of ethylene and propylene glycol. Typically, about 20 to about 50 percent by weight of an alkoxy-alkanol, e.g. 2-propoxy ethanol, or another oxygenated solvent may be used.

The second major component of the coating system is a water dispersible (either alone or in the presence of a co-solvent) epoxy resin having more than one terminal epoxide group. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A. Examples of suitable resins include those disclosed in U.S. Pat. No. 4,315,044, the disclosure of which is incorporated herein by reference. Particularly preferred epoxy resins are those disclosed in U.S. Ser. No. 08/255,732, and are self-dispersing curable epoxy resins prepared by contacting and reacting (a) 1.0 reactive equivalents of an epoxy resin, (b) from about 0.01 to 1.0 reactive equivalents of a polyhydric phenol, and (c) from about 0.005 to 0.5 reactive equivalents of an amine-epoxy adduct formed by contacting 1.0 equivalents of an aliphatic polyepoxide and from about 0.3 to 0.9 reactive equivalents of a polyoxyalkylene amine.

The polyoxyalkyleneamine comprises one or more amino-compounds comprising both an amine group and a substantially water-soluble polyether chain. Illustrative of the polyalkylene amine reactants are the JEFFAMINE® brand of polyoxyalkyleneamines.

The aliphatic polyepoxide reactant used to form the amine-epoxy adduct comprises one or more compounds each having a plurality of epoxide functional groups. The aliphatic epoxide has at least 2 epoxide groups and may have as many as 6 epoxide groups in the molecule.

The epoxy resin comprises one or more polyglycidyl ethers of polyhydric phenols having two or more epoxide groups and one or more six-carbon aromatized rings.

The polyhydric phenol reactant comprises one or more compounds each having a plurality of hydroxyl groups covalently bonded to one or more six carbon aromatized rings. The polyhydric phenol reactant may contain substitutents such as alkyl, aryl, sulfido, sulfonyl, halo and the like. The polyhydric phenol is represented by the formula $R_9(OH)_h$ where $R_9$ represents an "h" valent $C_6$–$C_{50}$ organic group comprising at least one six-carbon aromatized ring, and "h" represents a number of phenolic hydroxyl groups where "h" is equal to or greater than 2 but less than or equal to 6.

The maximum molecular weight of the epoxy resins is limited by the fact that the amount of epoxy resin employed in the second component is usually selected to achieve stoichiometric equivalence of epoxy groups with the amine hydrogen equivalents of the curing agent. Consequently, as the molecular weight of the epoxy resin increases, thereby increasing the epoxide equivalent weight, more of the epoxy resin is required to satisfy the stoichiometric requirement. However, the use of large amounts particularly of higher molecular weight epoxy resins is not preferred because they are water insoluble and become increasingly more difficult to microemulsify or disperse as the amount thereof is increased.

In view of the above, it is preferred to characterize the epoxy resin also in terms of its epoxide equivalent weight. Thus, the epoxide equivalent weight (WPE) of the glycidyl polyethers of dihydric phenols is not greater than about 1000, preferably from about 180 to about 700.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive amine hydrogen equivalent weight ratio of from about 0.5:1.0 to about 1.5:1.0, and, preferably, from about 0.8:1.0 to about 1.2:1.0.

The epoxy resins which are useful herein, may be either liquids or solids, so long as the resin is in the form of a stable aqueous dispersion.

When the epoxy resin and the curing agent are mixed, the resulting coating composition exhibits a useful pot life at room temperature, e.g. from about 2 hours to about 12 hours, and more typically from about 3 hours to about 8 hours. The pot life of the coating composition is herein defined to be the elapsed time from mixing the components together until the resulting composition is no longer suitable, with normal thinning, for application by spray, brush, or roll coating techniques to a substrate. The suitability for application by common techniques can be expressed in terms of the viscosity of the coating composition. Thus, the pot life of unpigmented coatings can be characterized as the elapsed time from mixing the two components to the time when the viscosity of the coating compositions drops below A1 or increases above Z6 as determined by the Gardner-Holdt method. For pigmented coatings, useful applications viscosities are between 50 and 140 Kreb Units (K.U.) as determined with a Stormer viscometer.

Coatings based on the compositions described herein can be formulated into easily handled two-package systems which blend together as easily as their solvent based counterparts. Application by brush, spray and roller-coating are typically free of bubbling and other film imperfections.

The coating systems described herein should also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion should also be excellent to three and four-year old alkyd and epoxy ester enamel films. Such systems may therefore be employed for repaint purposes in food processing plants and dairies and can also be used as adhesive compositions per se.

As pointed out above, a major advantage of the coating compositions of the instant invention is that they are useful in preparing solvent and chemically resistant coating compositions from aqueous based systems. These systems do not exhibit the traditional solvent related problems shown by solvent based systems and accordingly are preferred in end-use applications where non-polluting or nonflammable coatings systems are necessary. In addition, the cured state properties of compounds made from the curing agents disclosed herein are generally equivalent or superior to the properties of compounds prepared from prior art solvent based systems.

The following examples will serve to further illustrate the invention, but should not be construed to limit the invention, unless expressly set forth in the appended claims. All parts, percentages, and ratios are by weight unless otherwise indicated in context.

EXAMPLES

Example 1

A curing agent was prepared by charging to a flask 31.8 parts by weight of a 70% by weight aqueous solution of hexamethylenediamine (HMDA) in water (22.6 parts by weight of HMDA and thus 0.389 equivalents) and 8.2 parts by weight of isophorone diamine (0.0964 equivalents) with mixing and under dry nitrogen gas. The contents were heated to about 38° C. A total amount of 9.1 parts by weight (0.0478 equivalents) of bisphenol A diglycidyl ether homopolymer having an average of 1.15 bisphenol A groups per molecule and available from the Dow Chemical Co. as DER 331, was added dropwise with mixing over sufficient time to ensure the temperature of the reaction flask did not exceed 77° C. Then a total of 35.4 parts by weight (0.191 equivalents) of cresyl glycidyl ether (CGE) was added dropwise to the flask to ensure the temperature of the reaction flask did not exceed 77° C. Once the addition of epoxide reactants was complete, 15.5 parts by weight of 2-propoxyethanol was added and the flask was held at 54° C. for about 2 hours.

Example 2

The curing agent of Example 1 was used to cure an epoxy resin from an aqueous dispersion as follows. The epoxy resin dispersion of Example 3 of U.S. patent application Ser. No. 08/255,732, filed Jun. 14, 1994, referred to above prepared as follows: an amine-epoxide adduct is prepared by introducing into a 500 mL reaction flask equipped with a stirrer, heating mantle, nitrogen line, cooling condenser and thermometer 485 grams (0.4 equivalents) JEFFAMINE® 2,000 (Texaco Chemical Company, Houston, Tex.) and 142.2 (0.61 equivalents) of polyepoxide of propoxylated (SPO) pentaerythritol (Henkel Corporation, Ambler, Pa.). The reaction mixture is heated slowly to 125°–130° C. with stirring and is held at this temperature for about 2.5 hours. The reaction mixture is cooled to 70° C. and analyzed for epoxide and amine content. The amine-polyepoxide adduct has 0.4 meg/gm of total amine and 0.33 meg/gm of epoxide which indicates that about 66% of the initial free epoxide groups have been reacted with the amine.

A self-dispersing resin is prepared by introducing into a 250 mL reaction flask equipped with a heating mantle, nitrogen line, cooling condenser, thermometer and stirring means, 66.4 grams (0.348 equivalents) of the diglycidyl ether of bis-phenol A, and 19.6 grams (0.172 equivalents) of bis-phenol A. The mixture is heated to 95° C. and then 12.0 grams (0.004 equivalents) of the amine-epoxy adduct prepared above is added with 0.15 grams triphenyl phosphine. The mixture is heated slowly to 150° C. with stirring whereupon an exothermic reaction is observed. Cooling is immediately applied to maintain the reaction temperature between 150° C. and 160° C. After the exothermic reaction subsides, the reaction mixture Is maintained at 160° C. for an additional hour followed by a 15-minute period at 190° C. The reaction mixture is then cooled to 160° C. and 14 grams of propyl cellosolve is added and immediately begins refluxing. The reaction mixture is cooled to 100° C. and analyzed. The self-dispersed resin is present at 87.5% solids in propyl cellosolve, has 0.07 meg/gm total amine and an epoxide equivalent weight of 552 based on resin solids.

A water borne dispersion is prepared by introducing into a 500 mL reaction flask equipped with a stirrer, heating, mantle, nitrogen line, cooling condenser and thermometer, 112 grams of the self-dispersing resin (SDR) prepared above. The resin is heated to 100° C. and 16.5 grams of water are added gradually with stirring over a 30-minute period and the temperature is permitted to drop to 55° C. An additional 48 grams of water are added and the temperature is raised to 70° C. over twenty minutes. At 70° C., 2 grams of water are added followed by stirring for twenty minutes and then 3 grams of water are added. The resulting water-in-oil dispersion is stirred for 45 minutes while cooling to 45° C. and the water-in-oil dispersion forms an oil in water dispersion. After the phase inversion is complete, 2.0 grams of $C_8$–$C_{10}$ alcohol monoglycidyl ether from CVC Specialty Chemicals Corp. is added as a reactive diluent. Thirty-six and three tenths (36.3) grams water are added at 50° C. over a one-hour period. The resulting water borne dispersion contains 56% resin solids in water/propyl cellosolve (82/18) solvent. The water borne dispersion, in an amount of 200 parts by weight was ground with 123.7 parts by weight of titanium dioxide pigment (DuPont R-960) along with 17 parts by weight of oxygenated solvent (Ektasolve EP), and 103.9 parts by weight of water. To this grind paste was added a sufficient number of parts by weight of the curing agent of Example 1, above to provide a ratio of epoxy equivalents to active amine hydrogen equivalents of 1:1. This coating composition can be applied to cold rolled steel at a thickness of 56 micrometers to 62 micrometers and cured at room temperature.

What is claimed is:

1. An epoxy curing agent comprising the reaction product of reactants consisting essentially of:
   an amine component consisting essentially of a monoalkylene polyamine having less than about 12 carbon atoms and an alicyclic polyamine, said alicyclic polyamine being present in an amount greater than about 10% of the amine equivalents of said amine component,
   an aromatic mono-glycidyl ether having less than about 18 carbon atoms, and
   a diglycidyl ether of an aromatic diol having an average degree of oligomerization of less than about 3.5, wherein:
   the ratio of primary amine equivalents of said amine component to the total epoxide equivalents of said aromatic glycidyl ether and said diglycidyl ether of an aromatic diol is greater than one, and
   the ratio of epoxide equivalents of said aromatic monoglycidyl ether to epoxide equivalents of said diglycidyl ether of an aromatic diol is greater than one.

2. An epoxy curing agent of claim 1 wherein said aromatic mono-glycidyl ether is selected from the group consisting of mono-alkylphenyl glycidyl ethers and di-alkyl phenyl glycidyl ethers having from 9 to 13 carbon atoms.

3. An epoxy curing agent of claim 1 wherein said diglycidyl ether of an aromatic diol having an average degree of oligomerization of less than about 1.5.

4. An epoxy curing agent of claim 1 wherein said diglycidyl ether of an aromatic diol is comprises a diglycidyl ether of an alkyl bis-phenol.

5. An epoxy curing agent of claim 1 wherein the ratio of epoxide equivalents of said aromatic mono-glycidyl ether to epoxide equivalents of said diglycidyl ether of an aromatic diol is greater than 1.5.

6. An epoxy curing agent of claim 1 wherein the ratio of epoxide equivalents of said aromatic mono-glycidyl ether to epoxide equivalents of said diglycidyl ether of an aromatic diol is from about 2:1 to about 6:1.

7. An epoxy curing agent of claim 1 wherein the ratio of epoxide equivalents of said aromatic mono-glycidyl ether to epoxide equivalents of said diglycidyl ether of an aromatic diol is from about 3:1 to 5:1.

8. An epoxy curing agent of claim 1 wherein said ratio of epoxide equivalents is maintained essentially constant throughout said reaction by co-addition of said aromatic mono-glycidyl ether and said diglycidyl ether of an aromatic diol.

9. An epoxy curing agent of claim 1 wherein said mono-alkylene polyamine is a member selected from the group consisting of lower alkylene diamines having from 2 to 8 carbon atoms.

10. An epoxy curing agent of claim 9 wherein said mono-alkylene polyamine has only straight-chain alkylene groups.

11. An epoxy curing agent of claim 1 wherein the ratio of primary amine equivalents of said amine component to the total epoxide equivalents of said aromatic glycidyl ether and said diglycidyl ether of an aromatic diol is from about 1.5:1 to 2.5:1.

12. An epoxy curing agent of claim 1 wherein the ratio of primary amine equivalents of said amine component to the total epoxide equivalents of said aromatic glycidyl ether and said diglycidyl ether of an aromatic diol is from about 1.75:1 to about 2.25:1.

13. An epoxy curing agent of claim 1 wherein the ratio of equivalents of said mono-alkylene polyamine to said alicyclic polyamine is from about 2:1 to about 6:1.

14. An epoxy curing agent of claim 1 wherein the ratio of equivalents of said mono-alkylene polyamine to said alicyclic polyamine is from about 3:1 to about 5:1.

15. An epoxy curing agent of claim 1 wherein said alicyclic polyamine is selected from the group consisting of isophorone diamine, 1,2-diamino-cyclohexane and N-aminoethylpiperazine.

16. An epoxy curing agent of claim 1 wherein said mono-alkylene polyamine is hexamethylene diamine and said alicyclic amine is isophorone diamine.

17. An epoxy curing agent comprising the reaction product of reactants consisting essentially of:

an amine component consisting essentially of a lower alkylene diamine having from 2 to 8 carbon atoms and an alicyclic polyamine, said alicyclic polyamine being selected from the group consisting of isophorone diamine, a diamino-cyclohexane and N-aminoethylpiperazine and being present in an amount of greater than about 10% of the amine equivalents of said amine component, an aromatic mono-glycidyl ether having less than about 18 carbon atoms, and a diglycidyl ether of an aromatic diol having an average degree of oligomerization of less than about 3.5, wherein:

the ratio of primary amine equivalents of said amine component to the total epoxide equivalents of said aromatic glycidyl ether and said diglycidyl ether of an aromatic diol being from about 1.5:1 to about 2.5:1, and the ratio of epoxide equivalents of said aromatic mono-glycidyl ether to epoxide equivalents of said diglycidyl ether of an aromatic diol being from about 3:1 to 5:1.

18. An epoxy curing agent of claim 17 wherein the ratio of equivalents of said lower alkylene diamine to said alicyclic polyamine is from about 3:1 to about 5:1.

19. An epoxy curing agent of claim 18 wherein said lower alkylene diamine is hexamethylene diamine.

* * * * *